United States Patent [19]

Thompson

[11] Patent Number: 5,700,847
[45] Date of Patent: Dec. 23, 1997

[54] MOLDED POLYURETHANE FOAM WITH ENHANCED PHYSICAL PROPERTIES

[75] Inventor: Andrew M. Thompson, West Chester, Pa.

[73] Assignee: Arco Chemical Technology, L.P., Greenville, Del.

[21] Appl. No.: 566,559

[22] Filed: Dec. 4, 1995

[51] Int. Cl.$^6$ ................ C08J 9/06; C08G 18/10; C08G 18/48
[52] U.S. Cl. .............. 521/159; 521/130; 521/164; 521/167; 521/174; 521/176; 521/914; 521/137
[58] Field of Search ................... 521/130, 159, 521/164, 167, 174, 176, 914, 137

[56] References Cited

U.S. PATENT DOCUMENTS

| | | | |
|---|---|---|---|
| 2,948,691 | 8/1960 | Windemuth et al. | 521/174 |
| 3,026,275 | 3/1962 | Muller et al. | 521/129 |
| 3,042,631 | 7/1962 | Strandskov | 521/159 |
| 4,477,589 | 10/1984 | van der Hulst et al. | 502/169 |
| 4,579,700 | 4/1986 | Cavender | 264/46.4 |
| 4,717,518 | 1/1988 | Cavender | 264/51 |
| 5,070,114 | 12/1991 | Watts et al. | 521/159 |
| 5,070,125 | 12/1991 | Heuvelsland | 521/167 |
| 5,093,380 | 3/1992 | Takeyasu et al. | 521/131 |
| 5,100,997 | 3/1992 | Reisch et al. | 528/60 |
| 5,114,619 | 5/1992 | Heuvelsland | 252/182.27 |
| 5,158,922 | 10/1992 | Hinney et al. | 502/175 |
| 5,248,833 | 9/1993 | Hinney et al. | 568/621 |
| 5,278,274 | 1/1994 | Verhelst et al. | 528/44 |
| 5,300,535 | 4/1994 | Takeyasu et al. | 521/137 |
| 5,470,813 | 11/1995 | Le-Khac | 502/175 |
| 5,482,908 | 1/1996 | Le-Khac | 502/156 |
| 5,545,601 | 8/1996 | Le-Khac | 502/156 |
| 5,563,221 | 10/1996 | Pazos | 525/409 |
| 5,605,939 | 2/1997 | Hager | 521/137 |
| 5,648,447 | 7/1997 | Seneker et al. | 528/63 |
| 5,648,559 | 7/1997 | Hager | 568/620 |

FOREIGN PATENT DOCUMENTS

| | | |
|---|---|---|
| 2088521 | 8/1993 | Canada. |
| 0480588 | 4/1992 | European Pat. Off. . |

OTHER PUBLICATIONS

"Continuous Prepolymers", Liz White, Urethanes Technology Feb./Mar., 1995; p. 9.
Chemical Abstracts, 12899–900, vol. 64, 1966.
"Properties of Urethane Foams Related to Molecular Structure", R.E. Bolin, et al, Journal of Chemical and Engineering Data, vol. 4, No. 3, Jul., 1959 pp. 261–265.
"Properties of Flexible Urethane Foams", J.H. Saunders, et al, Chemical and Engineering Data Series, vol. 3, No. 1, 1958, pp. 153–161.
"Preparation of Urethane Polymers", H.L. Heiss, et al, Industrial and Engineering Chemistry, vol. 51, No. 8, Aug. 1959, pp. 929–934.
"Behavior of Isocyanate–Terminated Prepolymers in the Presence of Various Catalysts", J.W. Britain, I&EC Product Research and Development, vol. 1, No. 4, Dec. 1962, pp. 261–264.
Rubber Chemistry and Technology—Urethan Foams, J.H. Saunders 1960, pp. 1296–1301.
"Properties of a Semiflexible Urethane Foam System", R.L. Sandridge, et al Journal of Chemical and Engineering Data, vol. 5, No. 4, Oct. 1960, pp. 495–498.
"Urethane Polyether Prepolymers and Foams", H.G. Scholten, et al, Journal of Chemical Chemical and Engineering Data, vol. 5, No. 3, Jul., 1960 pp. 395–400.
"Molding of Prepolymer Based Resilient Urethane Foam", R.E. Knox, Rubber World, pp. 685–692, Feb. 1959.
Polyurethanes—Chemistry and Technology, J.H. Saunders and K.C. Frisch, Interscience Publishers, New York, NY, pp. 43, 65, and 99, 1962.
"Production of Soft Block Foams and TDI–Based Cold Cure–Molded Foams with No Use of CFCs", G.F. Lunardon, et al, 32nd Annual Polyurethane Technical Marketing Conference, Oct. 1–4, 1989, pp. 239–245.
Polyurethanes Chemistry & Technology, Part II–Tech., Saunders and Frisch, Wiley, 1964, pp. 38–43.
"Continuous Processing of Urethane Foam Prepolymers", J.R. Wall, Chemical Engineering Progress, vol. 57, No. 10, Oct. 1961, pp. 48–51.
"New Dynamic Flex Durability Test 1", K.D. Cavender, 33rd Annual Polyurethane Technical/Marketing Conference, Sep. 30–Oct. 3, 1990, pp. 282–288.
"Real Time Foam Performance Testing", K.D. Cavender, 34th Annual Polyurethane Technical/Marketing Conference Oct. 21–24, 1992, pp. 260–265.
"Urethane Applications for Novel High Molecular Weight Polyols", R.L. Mascioli, 32nd Annual Polyurethane Technical/Marketing Conference, Oct. 1–4, 1989, pp. 139–142.
"Polyurethane Sealants and Cast Elastomers with Superior Physical Properties", J.W. Reisch and D.M. Capone, 33rd Annual Polyurethane Technical/Marketing Conference, Sep. 30–Oct. 3, 1990, pp. 368–374.
Smith et al., "Thermoplastic Polyurethane Elastomers Made from High Molecular Weight POLY–L Polyols"; Polyurethanes World Congress 1991; Sep., 1991; pp. 313–318.

*Primary Examiner*—Rabon Sergent
*Attorney, Agent, or Firm*—Jonathan L. Schuchardt

[57] ABSTRACT

Isocyanate-terminated-prepolymers prepared from polyoxyalkylene polyether polyols having low unsaturation are suitable for producing polyurethane molded foam having exceptional physical properties. Preferably, the foams are all water blown, and process well. The foams are noted for concomitant increases in both tensile strength and elongation as well as displaying excellent wet set and other properties.

28 Claims, No Drawings

MOLDED POLYURETHANE FOAM WITH ENHANCED PHYSICAL PROPERTIES

TECHNICAL FIELD

The present invention pertains to molded, flexible polyurethane foam prepared by the prepolymer process. More particularly, the present invention pertains to molded polyurethane flexible foams prepared from isocyanate-terminated prepolymers derived from the reaction of an excess of di- or polyisocyanate with a polyol or polyol component having an unsaturation of less than 0.03 milliequivalents of unsaturation/per gram of polyol (meq/g). The molded foams display enhanced physical properties in addition to displaying excellent processing latitude. The foams are preferably all-water blown.

BACKGROUND ART

High resiliency (HR) polyurethane slab foam is now a high volume commercial product. HR slab foam is generally all-water blown and may be made by either prepolymer or one-shot technology. However, slab foam, while eminently suitable for applications such as carpet underlay and flat cushioning material for furniture, is unsuitable for applications which require contoured parts, for example automotive seating. For such applications, molded polyurethane foam is generally used. In molded foam, the foam forming ingredients are mixed and injected into a closed mold, which may be heated to 150°–300° C. (hot molding) or 30°–70° C. (cold molding). The admixture of multiple streams into the mix head is termed a "one-shot" process.

Because molded foam cannot rise unrestrained, as is the case with slab foam, the respective formulations are quite different. Even with different formulations, processing of molded foam is considerably more difficult than processing of slab foam, and often gives rise to a high scrap rate. A further difference between molded foam and slab foam is that the former must be crushed mechanically prior to complete cure, either by hand or by the use of rollers or similar devices. Alternatively, the foam may be "crushed" in situ through the use of timed pressure release (TPR) as disclosed in U.S. Pat. No. 4,579,700; by timed partial pressure release (TPPR); or by a combination of TPR and reduced mechanical crushing as disclosed in U.S. Pat. No. 4,717,518. The foregoing TPR patents are licensed worldwide.

Prepolymer technology has certain advantages over one-shot technology. Foams produced by prepolymer technology are subject to less processing related variation due to the use of fewer reactive chemical streams as opposed to one-shot foams. The polymer structure is also more controllable in prepolymer foams. Moreover, the use of prepolymer techniques allows the foam manufacturer to inventory fewer components. Although much early work in polyurethane foam technology centered on prepolymer techniques, today most flexible foam is produced by one-shot technology. With respect to molded foams, virtually all systems are one-shot. The reasons why prepolymer technology is not in widespread use in molded foam have to do with the nature of the molding process as opposed to the slab process.

For example, in the well known treatise on polyurethanes: "POLYURETHANES: CHEMISTRY AND TECHNOLOGY", J. H. Sanders and K. C. Frisch, Interscience Publishers, N.Y., p.99, the authors indicate that even one-shot technology was difficult with molded foam, and that completely satisfactory prepolymer systems were never fully achieved. Not only is the scrap rate cited as being high, particularly with regard to surface defects, but cure cycles are inordinately long in molded foams prepared from prepolymers. One-shot technology has reduced material usage due to decreased scrap rates, reduced labor costs, and eliminated lengthy curing cycles.

R. E. Knox, in "Molding of Prepolymer Based Resilient Urethane Foam", RUBBER WORLD, February 1959, pp. 685–692, has documented some of the defects, particularly surface defects, associated with prepolymer molded foam. Cited as assisting elimination of surface defects is the use of brushing or spray-coating the mold surface with surface active agents. However, this process involves additional steps which increase manufacturing costs.

Attempts to overcome the problems associated with molded polyurethane foams via prepolymers have generally focused on adjusting such variables as type of catalyst, catalyst levels, catalyst combinations, type and amount of cross-linker, isomer content of the isocyanate component, polyether polyol blends, and the like. However, while isolated, successful systems have sometimes prepared, these systems still suffer in terms of processing latitude as well as lacking the flexibility to readily accommodate desired changes in such physical properties such as density, foam softness, and the like. Fundamental changes in the nature of the prepolymer ingredients have not been proposed.

An example of the types of formulation adjustments referred to above is disclosed in U.S. Pat. No. 5,070,114, wherein water-blown, molded polyurethane foams are prepared from isocyanate-terminated prepolymers derived from methylenediphenylenediisocyanate (MDI) blends containing minimally 2 weight percent of 2,4'-MDI isomers. However, no molded foams are exemplified, only free rise foams having been produced.

In "Production of Soft Block Foams and TDI-Based Cold Cure-Molded Foams With No Use of CFCs", 32ND ANNULAR POLYURETHANE TECHNICAL MARKETING CONFERENCE, Oct. 1–4, 1989, G. F. Lunardon et al., hypersoft molded foams are prepared from toluene diisocyanate-based prepolymers and a special polyether polyol having a high ethylene oxide content, supplied as a separate stream. Polyether polyols with high terminal oxyethylene content are commonly utilized in one-shot molded foams due to the higher reactivity associated with high primary hydroxyl content, generally above 70 mol percent. However, appreciable amounts of such high ethylene oxide content polyols may undesirably affect numerous physical properties in humid environments. The resulting foams had relatively low resiliency and high compression set.

Polyoxyalkylene polyether polyols utilized in polyurethane foam production are conventionally manufactured by the base-catalyzed oxyalkylation of a two to eight-functional initiator molecule, generally using propylene oxide or mixtures of propylene oxide and ethylene oxide as the alkylene oxide. For one-shot molded polyurethane foams where high primary hydroxyl content is required, i.e., higher than 70 mol percent, the polyols are capped with polyoxyethylene moieties by employing solely ethylene oxide during the last stages of oxyalkylation. Use of such polyols often leads to problems in humid environments where absorption of water plasticizes the polyurethane.

During preparation of polyoxypropylene polyether polyols by base catalysis, a competing rearrangement of propylene oxide to allyl alcohol introduces unsaturated monols into the reaction mixture which themselves serve as monofunctional initiator molecules. The result is a gradual dilution of functionality and continued production of polyoxyalkylene monol of lower molecular weight. As a result, base-catalyzed polyol equivalent weight is limited to about 2000 Daltons (Da). Even at this modest equivalent weight, the functionality of a polyoxypropylene diol may be reduced from its nominal, or theoretical, functionality of 2 to the range of 1.5–1.7 or less. The product may contain as much as 40–45 or more mol percent monol, the monol fraction having a broad molecular weight distribution as well.

In the decade of the 60's, double metal cyanide complex catalysts (DMC catalysts) were developed for alkylene oxide polymerization. However, due to their greatly increased cost as compared to simple basic catalysts, and limited polymerization rate, such catalysts had not been widely used, despite their ability to produce polyoxyalkylene polyols with low unsaturation and low monol content. Non-stoichiometric metal cyanide complex catalysts, as disclosed, for example, in U.S. Pat. Nos. 5,100,997, 4,477, 589, 5,158,922, and 5,248,833 have exhibited increased polymerization rates as compared to the first generation DMC catalysts and have lowered unsaturation to the range of 0.015–0.018 meq/g in polyols in the c.a. 2000 Da equivalent weight range. However, the amount of catalyst required is still relatively high in view of catalyst cost. Most recently, however, the assignee of the present invention has developed highly efficient double metal cyanide complex catalysts which not only may be used in much smaller amounts than previously possible, but moreover provide polyoxyalkylene polyols with exceptionally low unsaturation, i.e., in the range of 0.002 to 0.007 meq/g. The measured functionality of such polyols closely approaches the nominal initiator functionality. Moreover, the polyols display a very narrow molecular weight distribution, as reflected by polydispersities ($M_w/M_n$) generally less than c.a. 1.2. Suitable methods of preparation are disclosed in copending U.S. applications Ser. Nos. 08/156,534 and 08/302,296. The foregoing patents and patent applications are herein incorporated by reference.

Double metal cyanide catalysis has certain drawbacks with respect to polyoxyethylene capped polyols, however. It has been discovered that terminating DMC-catalyzed alkylene oxide polymerization with ethylene oxide, rather than resulting in high primary hydroxyl, oxyethylene capped polyols, results in complex products believed to contain considerable quantities of homopolyoxyethylene. Thus, preparation of ethylene oxide capped polyethers employing double metal cyanide catalysts has required denaturing the double metal cyanide catalyst with base such as potassium hydroxide and continuing addition of ethylene oxide in a traditional base-catalyzed oxyalkylation. This adds significant cost and complexity to the polyol preparation process.

Although numerous benefits have been ascribed to the use of DMC-catalyzed polyoxyalkylene polyols, such polyols are not drop-in replacements for conventionally catalyzed polyols, for reasons not completely understood, but at least in major part due to the differences in monol content, actual functionality, and molecular weight distribution which lead to different polymer microstructure.

For example, as shown by R. E. Bolin et al., "Properties of Urethane Foams Related to Molecular Structure", J. CHEM. AND ENG. DATA, v.4, No. 3, July 1959, pp. 261–265, use of higher molecular weight polyols increases the molecular weight between branch points in the cross-linked polyurethane structure, and as a result, increases tensile elongation while decreasing tensile strength. At the same time, compression strength decreases as well, resulting in softer, more extensible foams. Thus, use of higher equivalent weight polyols, made possible through DMC-catalyzed oxyalkylation, should result in a softer, more extensible foam. However, R. L. Mascioli, "Urethane Applications for Novel High Molecular Weight Polyols", 32ND ANNUAL POLYURETHANE TECHNICAL/MARKETING CONFERENCE, Oct. 1–4, 1989, pp. 139–142, indicates that substitution of a double metal cyanide complex-catalyzed, low unsaturation 10,000 Da triol in a typical flexible foam formulation, rather than produce a softer, more extensible foam, produced a stiff and boardy product. J. W. Reisch et al. in "Polyurethane Sealants and Cast Elastomers With Superior Physical Properties", 33RD ANNUAL POLYURETHANE TECHNICAL MARKETING CONFERENCE, Sept. 30–Oct. 3, 1990, on page 368, indicates that substitution of a low unsaturation polyether polyol for a conventional, base-catalyzed polyol of higher unsaturation led to increased hardness in elastomers prepared from such polyols. While not directed to the present field of endeavor, the increased hardness of the elastomers mitigates against use of such polyols in polyurethane foams, where decreased hardness is generally the goal. Moreover, as the inventors of the present invention disclose below, in a one-shot molded polyurethane foam formulation, substitution for a conventionally catalyzed triol having a measured functionality of 2.2 by a DMC-catalyzed diol/triol blend having similar (2.3) functionality led to total foam collapse.

It would be desirable to provide to the polyurethane foam industry, a prepolymer composition suitable for preparing molded polyurethane foams with acceptable processing time and latitude. It would be further desirable to provide foam formulations which result in enhanced physical properties of the molded foam product. It would be yet further desirable to offer prepolymer foam formulations which allow for taking advantages of the unique properties of double metal cyanide catalyzed polyoxyalkylene polyols, without requiring high primary hydroxyl content.

SUMMARY OF THE INVENTION

It has now been surprisingly discovered that prepolymer-based molded polyurethane foams may be prepared from isocyanate-terminated prepolymers based on low-unsaturation polyoxyalkylene polyols. Moreover, it has been further surprisingly discovered, that not only do these prepolymers offer wide processing latitude and short cure cycles, but moreover, the molded polyurethane foams thusly prepared exhibit superior physical properties in virtually all categories, including vastly improved 50% wet compression set (wet set). Seldom is it possible to increase nearly all foam physical properties without a trade-off in terms of other properties.

DESCRIPTION OF THE PREFERRED EMBODIMENTS

The prepolymer foams of the subject invention are prepared by introducing the prepolymer formulations of the subject invention together with water and optionally auxiliary blowing agents and additives into a closed mold, allowing the reactive ingredients to foam, and recovering a molded, foamed polyurethane product. The isocyanate index of the reactive ingredients is advantageously between 70 and 130, preferably between 90 and 110, and most preferably c.a. 100. By the term "closed mold" is meant a mold which prevents unrestrained rise of foam. Such molds may be clamped in a closed condition following which the polyurethane reactive ingredients are injected into the mold cavity, or may be open molds into which the reactive ingredients are poured or metered, the mold being subsequently closed. Most such molds contain one or more vents which may be monitored to ascertain progress of the reaction. Such molds are closed molds as viewed by one skilled in the art.

The prepolymers of the subject invention are prepared by conventional prepolymer techniques employing an excess of di- or polyisocyanate or mixture thereof, but employing as the polyol component, a polyol component having a measured unsaturation of less than 0.03 meq/g, preferably less than 0.02 meq/g, and most preferably, less than 0.01 meq/g as measured by ASTM D-2849-69, "Testing of Urethane Foam Polyol Raw Materials". The polyol component used to prepare the prepolymers may comprise polyoxyalkylene polyether polyols in their entirety, mixtures of polyoxyalkylene polyether polyols with polymer-modified polyoxyalkylene polyether polyols as hereinafter described, or minor quantities of other, hydroxyl-functional polyols such as polyester diols, amino-terminated polyoxyalkylene polyether polyols, and other isocyanate-reactive polyols.

By polyoxyalkylene polyether polyol is meant a polyol derived from the additional polymerization of a vicinal alkylene oxide. Polyols prepared entirely from non-vicinal cyclic oxides such as oxetane and tetrahydrofuran are not polyoxyalkylene polyether polyols as that term is defined herein, although such polyols may be included in the polyol component. The "measured unsaturation" of the polyol component is the measured value, or weight average of measured values of the polyoxyalkylene polyether polyol portion of the polyol component only.

The polyoxyalkylene polyether polyols of the prepolymer polyol component are preferably prepared by the double metal cyanide complex-catalyzed oxyalkylation of a suitable initiator molecule or mixture thereof. Non-limiting examples of suitable initiator molecules are di- to octafunctional initiators such as water, ethylene glycol, propylene glycol, diethylene glycol, dipropylene glycol, hydroquinone, bisphenol A, neopentylglycol, cyclohexanediol, cyclohexanedimethanol, 2,2,4-trimethyl-1,5-pentanediol, glycerine, trimethylolpropane, pentaerythritol, dipentaerythritol, α-methylglucoside, sorbitol, mannitol, sucrose, methylol group-containing phenol/formaldehyde condensates, and the like.

Preferred nominal initiator functionality is from 2–6, preferably 2–4, and most preferably 2–3. Particularly when metal naphthenates or other low-unsaturation producing catalysts are used, amino-group containing initiators such as the various toluence diamine isomers, ethylene diamine, propylene diamine, tetrakis [2-hydroxyethyl- and 2-hydroxypropyl]ethylene diamine, alkanol amines such as triethanol amine, diethanoi amine, and monoethanol amine, aniline, methylenedianiline, diethylene triamine, and the like may be used as well. Thus, while it is preferred to employ DMC-catalysis to produce the polyoxyalkylene polyether polyols, other catalysts capable of producing low-unsaturation polyols may be used as well. Blends of initiator molecules may also be used, as well as blends of polyoxyalkylene polyether polyols individually prepared from single or multiple initiators. The preferred overall functionality of the polyol component used to form the isocyanate-terminated prepolymers of the subject invention ranges from about 2.3 to about 4, more preferably about 2.5 to 3.5.

Because low molecular weight initiators, particularly those with vicinal hydroxyl groups, may cause undesirably long induction periods and/or lower rates of oxyalkylation when oxyalkylation is catalyzed by DMC catalysts, polyoxyalkylene oligomers prepared from the foregoing or other initiators may advantageously be employed rather than the monomeric, low molecular weight initiators themselves.

Thus, oligomeric polyoxyalkylene polyol initiators having equivalent weights of from 100 to 1000 Da, preferably 100–600 Da are preferred. Such oligomeric polyoxyalkylene polyol initiators may be prepared by conventional base catalyzed oxyalkylation of the respective monomeric, low molecular weight initiator, following which the basic catalyst residues are removed or inactivated by neutralization, treatment with an adsorbent such as magnesium silicate followed by filtration, removal using ion exchange, etc. Other methods of preparing the oligomeric polyoxyalkylene polyol initiators are suitable as well.

The oxyalkylation of the initiator molecules is conducted with one or more higher alkylene oxides, optionally in admixture with ethylene oxide. By "higher alkylene oxide" is meant an alkylene oxide having 3 or more carbon atoms, for example, propylene oxide, 1,2- and 2,3-butylene oxide, $C_5$–$C_{18}$ α-olefin oxides, epichlorohydrin, and the like. Preferred are propylene oxide and butylene oxide, the former being most preferred. Use of mixtures of ethylene oxide and one or more higher alkylene oxides leads to essentially random copolymers. The ratio of higher alkylene oxide to ethylene oxide may be changed during oxyalkylation to produce multiple block polyols containing blocks of all higher alkylene oxide-derived moieties and/or one or more blocks of higher alkylene oxide/ethylene oxide moieties. Polymerization solely with ethylene oxide should be avoided when employing DMC catalysis.

The polyoxyalkylene polyols preferably contain from 0 to 25 weight percent more preferably 5 to 25 weight percent, and most preferably 5 to 20 weight percent oxyethylene moieties, present randomly or as a cap. Random oxyethylene moieties, as explained previously, may be incorporated simply by adding ethylene oxide along with higher alkylene oxide during oxyalkylation in the presence of a DMC-catalyst or other low-unsaturation producing catalyst. To prepare polyoxyethylene capped polyols, it is necessary to conduct oxyethylation with other than DMC catalysts, preferably, but not limited to, basic catalysts such as sodium or potassium hydroxides or alkoxides.

When oxyethylene-capped polyoxyalkylene polyols are desired, and the propylene oxide or mixed propylene oxide/ ethylene oxide polymerization has been effected with DMC-catalysts, the DMC catalysts or catalyst residues may be removed prior to introduction of conventional oxyalkylation catalysts if desired, but preferably, a basic catalyst is simply added without resort to DMC catalyst removal. The basic catalyst deactivates the DMC catalyst, permitting capping with oxyethylene moieties to prepare polyoxyalkylene polyether polyols having primary hydroxyl content ranging up to 100 mol percent. Preferably, however, the primary hydroxyl content is from 0 mol percent to about 70 mol percent, more preferably 0 mol percent to 50 mol percent, and most preferably 0 to 30 mol percent. It is most surprising that polyoxyalkylene polyether polyols prepared by DMC-catalyzed polymerization of mixtures of higher alkylene oxide and ethylene oxide, having no "cap" and having primary hydroxyl content less than 50 mol percent, advantageously less than 30 mol percent, are suitable for preparation of molded polyurethane foam, allowing polyol preparation without a separate oxyethylene capping step.

Regardless of their manner of preparation, the polyoxyalkylene polyether polyols, whether capped or not, have a weight average measured unsaturation of less than 0.03 meq/g polyol as measured by ASTM D-2849-69, preferably less than 0.02 meq/g, more preferably less than 0.01 meq/g. If the weight average unsaturation of the polyoxyalkylene polyether polyol portion of the polyol component, as herein defined, is not less than 0.03 meq/g, foams having the desired properties will not be obtained. Preferably, each polyol has an unsaturation of less than 0.015 meq/g. More preferably, each polyol has an unsaturation of less than 0.010 meq/g.

Polymer-modified polyols, when employed in the polyol component, are preferably prepared from the low-unsaturation polyoxyalkylene polyols previously described. Preferred polymer-modified polyols are prepared by the in situ polymerization of one or more vinyl monomers in the polyoxyalkylene polyol, variously termed the "base" or "carrier" polyol. Preferred vinyl monomers are acrylonitrile and styrene, although other monomers such as the various acrylates, methacrylates, and other vinyl monomers may be used as well. Methods for the in situ polymerization are well known to those skilled in the art, for example as evidenced by U.S. Pat. Nos. 3,383,351, 3,953,393, and 4,119,586, which are herein incorporated by reference. The polyoxyalkylene polyether base or carrier polyol is included when measuring or calculating the average unsaturation of the polyoxyalkylene polyether polyol portion of the polyol component.

In addition to the aforementioned polyvinyl polymer-containing polymer-modified polyols, polymer polyols may also be prepared by the addition of finely ground polymer particles or the in situ size-reduction of larger particles to form stable dispersions. Dispersions prepared by the reaction of isocyanates with various amino-functional, hydroxyl-functional, or combined amino/hydroxyl functional monomers to form the so-called PUD (polyurea dispersion) polyols, PID (polyisocyanurate dispersion) polyols, PIPA (reaction product of isocyanates with alkanolamines), PHD polyols, and the like, may also be used. All these polyols are well described in the literature. PHD and PIPA polyols are recognized commercial products.

The polyol component should have an average equivalent weight of 800 Da to 5000 Da, preferably from 1000 Da to 5000 Da, more preferably 1500 Da to 5000 Da, and most preferably about 1500 Da to 3000 Da. Equivalent weights and molecular weights expressed herein in Daltons (Da) refer to number average weights unless otherwise specified. The average hydroxyl number of the polyol component may range from 10 to 80, more preferably 10 to 56, and most preferably 15 to 35.

The polyol component may comprise but a single polyoxyalkylene polyol, a blend of polyoxyalkylene polyols, a single polyoxyalkylene polymer-modified polyol, or a blend of polyoxyalkylene polyols and polymer-modified polyoxyalkylene polyols. Preferably, polyoxyethylene capped polyoxypropylene/polyoxyethylene polyols having primary hydroxyl contents in excess of 50 mol percent are used in not more than a minor amount in the polyol component. The polyol component may further comprise hydroxyl functional polyesters, amino-functional polyoxyalkylene polyols and the like. The polyoxyalkylene polyols of the polyol component, whether conventional (non-polymer-modified) or polymer-modified polyols, are all preferably prepared with catalysts such that unsaturation is minimized. However, polyoxyalkylene polyols or polymer-modified polyoxyalkylene polyols prepared by base catalysis or other methods of catalysis which result in higher levels of unsaturation than 0.03 meq/g may be used, provided that the total unsaturation of the polyoxyalkylene polyether polyol portion of the polyol component is less than the previously defined limits, i.e., less than 0.03 meq/g, most preferably less than 0.01 meq/g.

The isocyanate components useful in preparing the isocyanate-terminated prepolymers of the subject invention include the known aromatic and aliphatic di- and polyisocyanates, for example 2,4- and 2,6-toluenediisocyanates and mixtures thereof (TDIs), 2,2'-, 2,4'- and 4,4'-methylene diphenylene diisocyanates and mixtures thereof (MDIs), polymethylene polyphenylene polyisocyanates (PMDIs), 1,6-hexanediisocyanate, isophoronediisocyanate, and mixtures of such isocyanates. Other isocyanates may be used as well. Also suitable are the so-called modified isocyanates prepared by reacting a di- or polyisocyanate with an isocyanate-reactive monomer or oligomer or with themselves. Examples are urethane-modified isocyanates prepared by reacting a di- or polyisocyanate or mixture thereof with one or more glycols, triols, oligomeric polyoxyalkylene diols or polyols or mixtures thereof; urea modified isocyanates prepared by reacting the isocyanate with a diamine or amino-terminated polyoxyalkylation polyether oligomer; and carbodiimide, polyisocyanurate, uretonimine, allophanate and uretdione modified polyisocyanates prepared by reacting the isocyanate or modified isocyanate with itself in the presence of a suitable catalyst. Such isocyanates and modified isocyanates are well established items of commerce. Particularly, preferred di- and/or polyisocyanates include TDIs, MDIs, PMDIs and mixtures of these, particularly mixtures of TDIs and MDIs, the latter preferably containing a substantial majority of the 4,4'-isomer.

The prepolymers of the subject invention are prepared in the conventional manner by reacting the polyol component with the isocyanate component with or without urethane promoting catalysts, as described, for example, in the POLYURETHANE HANDBOOK, Gunter Oertel, Hanser Publishers, Munich © 1985, POLYURETHANES: CHEMISTRY AND TECHNOLOGY, J. H. Saunders and K. C. Frisch, INTERSCIENCE PUBLISHERS, New York, 1963, and in U.S. Pat. No. 5,070,114, herein incorporated by reference. Continuous and batch processes for the preparation of isocyanate-terminated prepolymers are disclosed in "Continuous Processing of Urethane Foam Prepolymers", J. R. Wall, CHEMICAL ENGR. PROGRESS, V. 57, NO. 10, pp. 48–51; Sanders, op.cit., Part II, pp. 38–43; U.S. Pat. No. 5,278,274; European published application EP 0 480 588 A2; and Canadian Patent No. 2,088,521.

The prepolymers of the subject invention have a free isocyanate (NCO) group content of from 5 weight percent to 35 weight percent, preferably 6 weight percent to 25 weight percent, and advantageously 8 to 20 weight percent.

The isocyanate-terminated prepolymers comprise the A-side (iso side) of the molded polyurethane foam system. The B-side (resin side) of the subject invention molded polyurethane foam system employs isocyanate reactive components, blowing agent(s), surfactant(s), and other additives and auxiliaries, for example chain extenders, crosslinkers, catalysts, dyes, pigments, fillers, etc. One or more of the B-side components may, in the alternative, be included with the A-side components.

Catalysts are generally necessary. The catalysts may be selected from conventional urethane-promoting catalysts, for example, tin catalysts such as dibutyltin diacetate, dibutyltin dilaurate, stannous octoate, and the like; amine catalysts such as NIAX®A-1, diethylene triamine, 1,4-diazabicyclo[2.2.2]octane, and the like. Mixtures of metal catalysts and amine catalysts may be used as well. Preferred are amine catalysts. Amounts of catalysts may be readily determined by one skilled in the art, and may range, for example, from 0.1 to 5 weight percent based on the weight of the foam.

Suitable chain extenders include the various alkylene glycols and oligomeric polyoxyalkylene glycols with molecular weights up to about 300 Da, for example ethylene glycol, propylene glycol, 1,4-butanediol, 1,6-hexanediol, diethylene glycol, dipropylene glycol, tripropylene glycol, and the like. The amount of chain extender may be adjusted to provide the necessary processing or physical parameters of the foam. Preferably, only most minor amounts of chain extenders are used, for example less than 10% by weight and preferably less than 5% by weight relative to foam weight. Amino-functional chain extenders such as MOCA, toluene diamine, and hindered aromatic amines may also be suitable.

Suitable cross-linkers include polyhydroxy functional monomeric compounds such as glycerine, but preferably alkanolamines such as monoethanolamine, diethanolamine (DEOA) and triethanolamine (TEOA). As with the chain-extenders, cross-linkers, when used, are preferably used in most minor amounts, for example less than 10 weight percent and most preferably less than 5 weight percent relative to total foam weight. Both chain extenders and cross-linkers, when used, are preferably dissolved in water which serves as the blowing agent.

A cell-stabilizing surfactant is generally required. Suitable cell-stabilizing surfactants include the various organopolysiloxanes and polyoxyalkylene organopolysiloxanes as are well known to those skilled in the art. Suitable surfactants include DC5043 available from Air Products, and Y-10,515 available from OSi, Inc. Additional surfactants are available from Wacker Silicones, Adrian, Mich., and Goldschmidt A.G., Germany. Combinations of surfactants may also be used, for example, a blend of Tergitol 15-S-9 available from the Union Carbide Corporation and DC5043. The amount of surfactant should be an amount effective to avoid foam collapse, and is readily ascertained by one skilled in the art. Amounts of from 0.1 to about 5 weight percent, preferably 0.5 to 2 weight percent based on the weight of the foam may be suitable.

The B-side may further contain polyoxyalkylene polyols and/or polymer-modified polyoxyalkylene polyols wherein the polyols have molecular weights of c.a. 300 Da or higher, preferably equivalent weights of from 500 to 5000, more preferably 1000 to 3000. Up to about 50 weight percent of total polyol, preferably up to 25% of total polyol may be contained in the B-side as opposed to the prepolymer, as the polyol contained in the prepolymer does not have to react, being already incorporated into the prepolymer. Most preferably, the prepolymer contains in excess of 90% of total polyol, and in particular virtually all polyol. For the same reason, high primary hydroxyl content is not necessary for any B-side polyol. However, B-side polyols may advantageously contain greater than 50 mol percent, and more preferably greater than 70 mol percent primary hydroxyl groups. Preferably, no additional polyoxyalkylene polyol is contained in the B-side formulation. Preferably, polyols contained in the B-side (isocyanate reactive component) have unsaturations such that the total unsaturation of the polyoxyalkylene polyols contained in the B-side is less than 0.03 meq/g.

The B-side contains one or more blowing agents of the chemical and/or physical type. The preferred blowing agent is water, which reacts with isocyanate to generate urea linkages with concomitant release of carbon dioxide gas. Physical blowing agents may also be used, either alone or in conjunction with water. Non-limiting examples of additional blowing agents include the lower alkanes, e.g., butane, isobutane, pentane, cyclopentane, hexane, and the like; the chlorofluorocarbons (CFCs), e.g. chlorotrifluoromethane, dichlorodifluoromethane, and the like; the hydrochlorofluorocarbons (HCFCs) such as fluorodichloromethane and chlorodifluoromethane; the perfluorinated $C_3$–$C_8$ aliphatic and cycloaliphatic hydrocarbons (PFCs) and substantially fluorinated analogous (HPFCs); chlorinated hydrocarbons such as methylenedichloride, liquid $CO_2$, and the like. CFC's are preferably avoided due to environmental concerns. As stated previously, the preferred blowing agent is water, which is most preferably used as the sole blowing agent. Frothing agents such as $CO_2$, nitrogen, and air may be introduced as well.

The amount of blowing agent is selected so as to provide a foam density of from about 1.0 lb/ft$^3$ or less to 4.0 lb/ft$^3$ or more, more preferably 1.0 lb/ft$^3$ to 3.0 lb/ft$^3$, and most preferably about 1.2 lb/ft$^3$ to about 2.8 lb/ft$^3$. Amounts of water ranging from 1.0 part to 7.0 parts per 100 parts of total polyol component, preferably 2.0 parts to about 6.0 parts are especially preferred.

The A-side and B-side are combined in conventional fashion employing a low pressure or high pressure mix head and introduced into the mold which is optionally and preferably maintained above ambient temperature. The mold temperature may be maintained at a temperature suitable for either hot or cold molding. The mold may be closed, with foam forming ingredients introduced into a suitable charging port, or may be an open mold which is closed following introduction of the foam formulation. The foam is cured, demolded, TPRed and/or crushed, and cured in the conventional manner. It has been surprisingly discovered that not only do the foam formulations of the subject invention process well, but moreover, the foams are of superior quality as compared to conventional foams from similar systems. Moreover, these results are achievable from polyols independent of primary hydroxyl content normally required to produce molded foam. The foams preferably have wet sets of less than 15%, preferably less than 10%.

Having generally described this invention, a further understanding can be obtained by reference to certain specific examples which are provided herein for purposes of illustration only and are not intended to be limiting unless otherwise specified.

COMPARATIVE EXAMPLES 1 and 2

Two "one-shot" formulations as set forth in Table 1, one containing a low monol polyol in the B-side, the second containing a conventional EO-capped, KOH-catalyzed polyol with much higher unsaturation but similar polyol functionality. As can be seen, low unsaturation polyols of low primary hydroxyl content do not produce foam in typical HR fashion.

TABLE 1

|  | Low Unsat. | Conventional |
|---|---|---|
| Foam Composition: |  |  |
| Low Unsaturation Base Polyol | 74 |  |
| Conventional Polyol |  | 74 |
| Polymer Polyol | 26 | 26 |
| Water | 4.1 | 4.1 |
| DEOA | 1.2 | 1.2 |
| Niax A-107 | 0.20 | 0.20 |
| Niax A-33 | 0.40 | 0.40 |
| OSi Y-10, 515 | 1.00 | 1.00 |
| TDI | 100 index | 100 index |
| Polyol Properties |  |  |
| Hydroxyl Number (mgKOH/g) | 28 | 28 |
| Polyol Functionality | 2.3 | 2.2 |

TABLE 1-continued

|  | Low Unsat. | Conventional |
|---|---|---|
| Ethylene Oxide Content (wt. %) | 15 | 15 |
| Primary Hydroxyl Content (mol %) | 22 | 75 |
| Polyol Unsaturation (meq/g) | 0.003 | 0.070 |
| Foam Properties: | | |
| Molded Part Density (lb/ft$^3$) |  | 1.80 |
| Resiliency (%) |  | 69 |
| 25% IFD (lbs) | Total | 24 |
| 50% IFD (lbs) | Collapse | 44 |
| 65% IFD (lbs) |  | 68 |
| Tensile Strength (psi) |  | 22 |
| Elongation at Break (psi) |  | 186 |
| Tear Strength (lb/in) |  | 1.55 |
| 75% Dry Compression Set (%) |  | 7 |
| 50% Humid-Aged Compression Set (%) |  | 18 |
| 50% Wet Compression Set (%) |  | 32 |

Comparative Examples 1 and 2 illustrate that substitution of low monol, exclusively DMC-catalyzed polyol having low unsaturation for a conventional polyurethane molding polyol (high primary hydroxyl), despite having the same overall oxyethylene content, results in a foam system in which the foam totally collapses in one-shot molded foam.

EXAMPLE 1 and COMPARATIVE EXAMPLE 3

Molded foams were produced utilizing a prepolymer process with low unsaturation and conventional (high unsaturation, high monol content) polyether polyols of similar overall functionality. Two low monol, low unsaturation polyols, a triol and a diol, were blended to produce a base polyol composition which has an actual functionality similar to the control. Note that actual, or measured functionality is a measure of the actual polyol functionality and is not the "nominal" functionality, or functionality of the polyol starter, as is normally reported. These examples compare foams which are either entirely low monol or conventional (i.e., both base polyol and polymer polyol are either low unsaturation or conventional). The polymer solids content of each foam was identical, the difference in polymer polyol content the result of normalization of solids levels (the low unsaturation polymer polyol was 43 weight percent solids, the conventional polymer polyol, 38 weight percent solids).

The results shown below indicate significant and surprising improvements in firmness, tensile strength, elongation, tear strength, dry compression sets, humid-aged compression sets, wet sets, and the durability parameters: creep, load loss, and height loss, when prepolymers prepared from low unsaturation polyols are employed. Testing of dynamic properties is discussed in several articles, including "New Dynamic Flex Durability Test. 1", K. D. Cavender, 33RD ANNUAL POLYURETHANE TECHNICAL/MARKETING CONFERENCE, Sept. 30–Oct. 3, 1990, pp. 282–288; "Real Time Foam Performance Testing", K. D. Cavender, 34TH ANNUAL POLYURETHANE TECHNICAL/MARKETING CONFERENCE, Oct. 21–24, 1992, pp. 260–265; and "Real Time Test for Auto Seating Foam", SAE INTL. CONGRESS & EXPOSITION, Paper No. 930634, 1993.

TABLE 2

|  | Low Unsaturation Polyol | Conventional Polyol |
|---|---|---|
| Prepolymer Composition | | |
| Low Unsaturation Base Polyol[1] (OH = 28) | 73 | — |
| Conventional Base Polyol[2] (OH = 28) | — | 70 |
| Arcol 2580[4] | 4 | 4 |
| Low Unsaturation Polymer Polyol[3] | 23 | — |
| Conventional Polymer Polyol[5] | — | 26 |
| TDI/MDI (80/20) | 42 | 42 |
| Polymer Solids Content | ~10% | ~10% |
| Base Polyol Functionality | ~2.3 | ~2.2 |
| Base Polyol Unsaturation (meq/g) | 0.003 | 0.07 |
| Foam Composition | | |
| Low Unsaturation Prepolymer (above) | 100 | — |
| Conventional Prepolymer (above) | — | 100 |
| Water | 2.5 | 2.5 |
| OSi Niax A-1 Catalyst | 0.25 | 0.25 |
| Surfactant Blend (Tergitol 15-S-9/DC5043) | 1.1 | 1.1 |
| Foam Properties | | |
| Molded Part Density (lb/ft$^3$) | 2.3 | 2.3 |
| Resiliency (%) | 61 | 62 |
| 25% IFD (lbs) | 38 | 33 |
| 50% IFD (lbs) | 62 | 59 |
| 65% IFD (lbs) | 84 | 83 |
| Tensile Strength (psi) | 20.2 | 14.7 |
| Elongation at Break (psi) | 178 | 135 |
| Tear Strength (lb/in) | 2.20 | 1.91 |
| 50% Dry Compression Set (%) | 4.5 | 8.4 |
| 75% Dry Compression Set (%) | 3.1 | 6.8 |
| 50% Humid-Aged Compression Set (%) | 8.0 | 11.1 |
| 50% Wet Compression Set (%) | 9.0 | 24.1 |
| Dynamic Fatigue Properties | | |
| Creep, % | 8.0 | 9.2 |
| Load Loss, % | 15.6 | 21.8 |
| Height Loss, % | 1.4 | 2.4 |

[1] A polyoxypropylene/polyoxyethylene polyol containing 15 weight percent oxyethylene moieties prepared by the DMC-catalyzed oxyalkylation of a mixed diol/triol starter, having an unsaturation of c.a. 0.005 meq/g, a primary hydroxyl content of c.a. 30%, and a functionality of 2.3.
[2] A base (KOH) catalyzed polyoxypropylene/polyoxyethylene polyol having an unsaturation of 0.07 meq/g, a measured functionality of 2.2, and containing 15% by weight oxyethylene moieties as a cap.
[3] A polymer-modified polyol containing 43 weight percent of 37/63 acrylonitrile/styrene solids polymerized in situ in a 6000 Da m.w. polyoxypropylene/polyoxyethylene DMC-catalyzed low unsaturation polyol containing 15% random oxyethylene moieties.
[4] A cell-opening polyol, conventionally catalyzed, having 75% oxyethylene and 25% oxypropylene moieties co-fed (random), and a hydroxyl number of 40.
[5] Polymer modified polyol similar to the low-unsaturation polymer modified polyol, but containing 38% solids, the base polyol unsaturation being c.a. 0.04 meq/g.

Example 1 and Comparative Example 3 illustrate the unexpected and surprising increases in foam physical properties achieved when employing prepolymers based on low unsaturation polyols as compared to conventionally base-catalyzed polyol-derived prepolymers. Both foam formulations had the same solids content, contributed by the polymer-modified polyol used in prepolymer preparation. Noteworthy is the increase in 25% IFD, and the considerable improvements in both tensile strength (37% increase) and elongation at break (32% increase). The prior art suggests that improvement in one of the latter two properties would be expected to result in a decrease in the other of the two properties. The tear strength is increased also, but perhaps the most notable improvements are in both the dry and humid aged compression sets, and particularly the wet set performance, the latter showing a 67 percent improvement!

Wet set is particularly important in molded seating, e.g. automotive seating, where exposure to hot, humid environments such as are found in the Southern United States and the tropics is expected.

In addition to the static properties discussed above, the subject foams also displayed noticeably improved dynamic fatigue properties, such as resistance to creep, load loss, and height loss, and demonstrated superior composite durability as well.

EXAMPLE 2

A molded foam was prepared from an isocyanate terminated prepolymer prepared by reacting 73 parts of a glycerine-initiated polyoxypropylene polyol having an unsaturation of 0.003 meq/g containing 15 weight percent random oxyethylene moieties and a primary hydroxyl content of 30 percent; 23 parts of a polymer polyol having 43% acrylonitrile/styrene (37/63)solids as the dispersed phase in a conventionally catalyzed base polyol having a hydroxyl number of 35 and 19% oxyethylene content; 4 parts ARCOL® 2580 polyether polyol, a conventionally catalyzed 40 hydroxyl number 75% oxyethylene/25% oxypropylene random polyol; with 42 parts of an 80/20 blend of TDI/MDI. The prepolymer was reacted with water, 3.5 parts; diethanolamine, 1.0 part; NIAX® A-1 amine catalyst 0.25 part; and Air Products DC5043 silicone surfactant, 1.0 part. Foam test results are presented below.

| Foam Results: | |
|---|---|
| Molded Part Density (lb/ft$^3$) | 2.3 |
| Resiliency (%) | 66 |
| 25% IFD (lbs) | 31 |
| 50% IFD (lbs) | 53 |
| 65% IFD (lbs) | 77 |
| Tensile Strength (psi) | 16.9 |
| Elongation at Break (psi) | 125 |
| Tear Strength (lb/in) | 1.52 |
| 50% Dry Compression Set (%) | 5.8 |
| 75% Dry Compression Set (%) | 5.3 |
| 50% Humid-Aged Compression Set (%) | 8.5 |
| 50% Wet Compression Set (%) | 11.0 |

EXAMPLE 4 and COMPARATIVE EXAMPLE 6

In a manner similar to that disclosed in Example 1, further prepolymer formulations employing low unsaturation polyols and base-catalyzed polyols of similar functionality were employed to produce molded foam. The formulations and foam physical properties are given below in Table 4.

TABLE 4

| | Low Unsaturation Polyol | Conventional Polyol |
|---|---|---|
| Prepolymer Composition | | |
| Low Unsaturation, 28 OH triol[1] | 38.5 | |
| Low Unsaturation, 28 OH diol[2] | 36.5 | |
| Conventional Polyol, 28 OH triol[3] | | 73 |
| Arcol 2580 (40 OH polyol) | 4 | 4 |
| Polymer Polyol[4] | 23 | 23 |
| 80/20 TDI/MDI Isocyanate Blend | 42 | 42 |
| Base Polyol Functionality | ~2.5 | ~2.5 |
| Foam Formulation | | |
| Low Unsaturation Polyol | 100 | |
| Conventional Polyol Prepolymer | | 100 |
| Water | 2.5 | 2.5 |
| OSi Niax A-1 Catalyst | 0.18 | 0.18 |
| Surfactant Blend (UCC Tergitol 15-S-9/DC5043) | 0.35 | 0.35 |
| Foam Properties | | |
| Molded Density (lb/ft$^3$) | 2.3 | 2.3 |
| 25% IFD (lbs.) | 37 | 37 |
| 65% IFD (lbs.) | 84 | 82 |
| Tensile Strength (psi) | 20.2 | 18.0 |
| Elongation (%) | 178 | 161 |
| Tear Strength (lb/in) | 2.20 | 1.89 |
| 50% Compression Set (%) | 4.5 | 7.6 |
| 75% Compression Set (%) | 3.1 | 6.3 |
| 50% Humid Compression Set (%) | 8.0 | 11.2 |
| 50% Wet Set (%) | 9.0 | 30.3 |

[1]A polyoxypropylene/polyoxyethylene, oxypropylated glycerine oligomer initiated, random copolymer prepared by DMC catalysis containing 15% by weight oxyethylene moieties, a primary hydroxyl content of 30 mol percent, and an unsaturation of 0.005 meq/g.
[2]A polyoxypropylene/polyoxyethylene, oxypropylated propylene glycol oligomer initiated random copolymer prepared by DMC catalysis containing 15% by weight oxyethylene moieties, a primary hydroxyl content of 30 mol percent, and an unsaturation of 0.005 meq/g.
[3]A base-catalyzed (KOH) glycerine initiated polyoxypropylene/polyoxyethylene triol having an unsaturation of 0.07 meq/g, a functionality of 2.2, and containing 15 weight percent oxyethylene moieties as a cap.
[4]Polymer-modified polyol containing 43% solids, the base polyol unsaturation being c.a. 0.04 meq/g.

As can be seen, consistent with prior examples, foam properties are considerably improved when molded foam is prepared from prepolymers derived from low unsaturation polyols are utilized.

Having now fully described the invention, it will be apparent to one of ordinary skill in the art that many changes and modifications can be made thereto without departing from the spirit or scope of the invention as set forth herein.

What is claimed is:

1. A process for the preparation of molded polyurethane foam, comprising reacting, in a closed mold, a foam-forming reactive mixture comprising:

a) an isocyanate component comprising in major part an isocyanate-terminated prepolymer having an NCO group content of from about 5 to about 35 weight percent based on the weight of said isocyanate-terminated prepolymer, said isocyanate-terminated prepolymer prepared by the reaction of a stoichiometric excess of one or more di- or polyisocyanates with a polyol component containing a polyoxyalkylene polyether polyol portion comprising recurring units derived from one or more higher alkylene oxides and having an unsaturation of less than 0.03 meq unsaturation per gram of polyoxyalkylene polyether polyol portion and a number average equivalent weight of about 1500 to about 5000; with b) one or more isocyanate reactive component(s), at an isocyanate index of between 70 and 130; optionally in the presence of an effective amount of one or more catalysts which promote the reaction of a) with b), a cell-stabilizing effective amount of one or more surfactants; and an amount of blowing agent sufficient to provide a foam density between about 1.0 lb/ft$^3$ and 4.0 lb/ft$^3$.

2. The process of claim 1 wherein said polyoxyalkylene polyether portion of said polyol component has an unsaturation of 0.02 meq unsaturation per gram of polyoxyalkylene polyether polyol portion.

3. The process of claim 1 wherein said polyoxyalkylene polyether polyol portion of said polyol component has an unsaturation of 0.01 meq unsaturation per gram of polyoxyalkylene polyether polyol portion.

4. The process of claim 1 wherein a majority of said polyol component comprises one or more higher polyoxyalkylene/polyoxyethylene polyether polyols having nominal functionalities between 2 and 8 and an average primary hydroxyl content of less than 70 mol percent based on the moles of said higher polyoxyalkylene/polyoxyethylene polyether polyols.

5. The process of claim 1 wherein a majority of said polyol component comprises one or more polyoxyalkylene/polyoxyethylene polyether polyols having nominal functionalities between 2 and 8 and an average primary hydroxyl content of less than 50 mol percent based on the moles of said polyoxypropylene/polyoxyethylene polyester polyols.

6. The process of claim 1 wherein a majority of said polyol component comprises one or more polyoxypropylene/polyoxyethylene polyether polyols, each having an unsaturation less than about 0.015 meq/g, each having at least one terminal block comprising random oxyethylene and oxypropylene moieties, and each having a primary hydroxyl content of less than about 50 mol percent.

7. The process of claim 1 wherein a minor amount of said polyol component comprises a polyoxypropylene/polyoxyethylene polyether polyol having a polyoxyethylene cap such that said polyoxypropylene/polyoxyethylene polyether polyol has a primary hydroxyl content greater than 50 mol percent.

8. The process of claim 1 wherein said polyol component comprises a polymer-modified polyol.

9. The process of claim 1 wherein said isocyanate reactive component comprises one or more polyoxyalkylene polyols.

10. The process of claim 9 wherein said one or more polyoxyalkylene polyols together have an average unsaturation of less than 0.03 meq/g.

11. The process of claim 10 wherein a portion of said one or more polyoxyalkylene polyols has a primary hydroxyl content of greater than about 70 mol percent.

12. The process of claim 1 wherein said isocyanate reactive component comprises water which further serves as a reactive blowing agent.

13. The process of claim 12 wherein water is the sole blowing agent.

14. The process of claim 1 wherein said isocyanate reactive component comprises a chain extender and/or cross-linker.

15. The process of claim 14 wherein said cross-linker is selected from the group consisting of the alkanol amines.

16. The process of claim 15 wherein a cross-linker is diethanolamine or triethanolamine.

17. The process of claim 1 wherein said di- or polyisocyanate is selected from the group consisting of TDI, MDI, and mixtures thereof; said polyol component has an average unsaturation of less than 0.02 meq/g and comprises in major part one or more polyoxypropylene/polyoxyethylene polyether polyols and/or polymer-modified polyoxypropylene/polyoxyethylene polyether polyols, each having an unsaturation less than about 0.01 meq/g and a primary hydroxyl content of less than about 50 mol percent; wherein said isocyanate reactive component comprises water as a sole blowing agent and further contains less than about 5 weight percent based on the weight of the foam of an alkanolamine crosslinker.

18. A polyurethane molded foam, prepared by the process comprising reacting:

a) an isocyanate component comprising in major part an isocyanate-terminated prepolymer having an NCO group content of from about 5 to about 35 weight percent based on the weight of said isocyanate-terminated prepolymer, said isocyanate-terminated prepolymer prepared by the reaction of a stoichiometric excess of one or more di- or polyisocyanates with a polyol component containing a polyoxyalkylene polyether polyol portion comprising recurring units derived from one or more higher alkylene oxides and having an unsaturation of less than 0.03 meq unsaturation per gram of polyoxyalkylene polyether polyol portion and a number average equivalent weight of about 1500 to about 5000; with b) one or more isocyanate reactive component(s), at an isocyanate index of between 70 and 130; optionally in the presence of an effective amount of one or more catalysts which promote the reaction of a) with b), a cell-stabilizing effective amount of one or more surfactants; and an amount of blowing agent sufficient to provide a foam density between about 1.0 lb/ft$^3$ and 4.0 lb/ft$^3$.

19. The foam of claim 18 wherein said polyoxyalkylene polyether portion of said polyol component has an average unsaturation of less than about 0.02 meq/g.

20. The foam of claim 18 wherein a majority of said polyol component comprises one or more higher polyoxyalkylene/polyoxyethylene polyether polyols and/or polymer-modified higher polyoxyalkylene/polyoxyethylene polyether polyols each having an unsaturation of less than about 0.01 meq/g, a nominal functionality of from 2 to 8, a number of average equivalent weight between about 800 Da to 5000 Da, and a primary hydroxyl content of less than about 50 mol percent.

21. The foam of claim 20 wherein the number average equivalent weight of at least one of said one or more higher polyoxyalkylene/polyoxyethylene polyether polyols and/or polymer-modified higher polyoxyalkylene/polyoxyethylene polyether polyols is between about 1500 Da and 3000 Da.

22. The foam of claim 18 wherein said isocyanate reactive component comprises water which further serves as a reactive blowing agent.

23. The foam of claim 22 wherein water is the sole blowing agent.

24. The foam of claim 22 wherein said isocyanate reactive component further comprises one or more of a chain extender or cross-linker, said chain extender or cross-linker comprising less than about 5 weight percent based on the weight of said foam.

25. The foam of claim 18 wherein said isocyanate reactive component comprises one or more polyoxyalkylene polyols having a primary hydroxyl content of 70 mol percent or more.

26. The foam of claim 25 wherein said polyoxyalkylene polyol having a primary hydroxyl content of 70 mol percent or more comprises a polyoxypropylene/polyoxyethylene polyether polyol containing at least one polyoxyethylene terminal block.

27. The foam of claim 18 wherein the wet set is less than about 15%.

28. The foam of claim 27 wherein the wet set is less than about 10%.

* * * * *